United States Patent
Kuehn et al.

(10) Patent No.: US 11,794,876 B1
(45) Date of Patent: Oct. 24, 2023

(54) RAM AIR TURBINE INCLUDING DAMPING ELEMENT TO VARY NATURAL FREQUENCY

(71) Applicant: Hamilton Sundstrand Corporation, Charlotte, NC (US)

(72) Inventors: Daniel Kuehn, Seattle, WA (US); Stephen M. Bortoli, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/716,190

(22) Filed: Apr. 8, 2022

(51) Int. Cl.
*B64C 11/00* (2006.01)
*B64D 41/00* (2006.01)

(52) U.S. Cl.
CPC .......... *B64C 11/008* (2013.01); *B64D 41/007* (2013.01)

(58) Field of Classification Search
CPC ............................ B64C 11/008; B64D 41/007
See application file for complete search history.

(56) References Cited

U.S. PATENT DOCUMENTS

| | | | |
|---|---|---|---|
| 2,963,093 A | | 12/1960 | Drexel et al. |
| 4,742,976 A | * | 5/1988 | Cohen ................. F03D 9/25 244/58 |
| 5,398,780 A | * | 3/1995 | Althof ................. F16H 25/20 188/185 |
| 8,814,520 B2 | * | 8/2014 | Russ .................. B64D 41/007 244/58 |
| 9,217,417 B2 | * | 12/2015 | Taneja .................. F03D 80/70 |
| 2010/0158698 A1 | * | 6/2010 | Russ .................. B64D 41/007 416/244 A |
| 2012/0237347 A1 | | 9/2012 | Chaudhry et al. |

OTHER PUBLICATIONS

European Search Report for Application No. 23166968.0, dated Aug. 23, 2023, 7 pages.

* cited by examiner

*Primary Examiner* — Juan G Flores
(74) *Attorney, Agent, or Firm* — CANTOR COLBURN LLP

(57) ABSTRACT

A ram air turbine (RAT) assembly includes a turbine having at least one turbine blade that rotates about a turbine driveshaft, a lower gear box coupled to the driveshaft, a generator/pump housing and a strut connected between the lower gear box and the generator/pump housing. The assembly also includes a damping element connected to one of the strut and the lower gear box. The damping element includes an actuator including an extendable member and a mass element connected to the extendable member and that can be moved by the extendable member from a retracted position to an extended position, wherein the mass element is closer to the actuator when in the retracted position than when in the extended position.

15 Claims, 4 Drawing Sheets

RAM AIR TURBINE INCLUDING DAMPING ELEMENT TO VARY NATURAL FREQUENCY

BACKGROUND OF THE INVENTION

Exemplary embodiments generally relate to emergency power supplies for aeronautical applications, and more particularly, to an improved ram air turbine.

Aircrafts include, as standard equipment, a back-up power source for use in times of power outage in the main power system. This standard equipment has been in the form of a ram air-driven turbine. The back-up equipment is stowed in a storage bay within the fuselage or wing of the aircraft. If/when needed, the back-up equipment can be deployed into the airstream where the passing air relative to the speed of the aircraft causes the turbine blades to rotate.

One example of such back-up equipment is a ram air turbine (RAT). A RAT may generate hydraulic power, electric power, or both. The turbine is coupled to suitable power generating equipment, such as a hydraulic pump for hydraulic power, or an electric generator for electric power, or both in the case of a hybrid RAT.

The RAT storage bay of the aircraft, as well as an access door to the RAT storage bay, are sized to store the ram air turbine and a deployment mechanism for the ram air turbine with only enough space to closely receive the equipment, thereby minimizing wasted space. In most cases, the structural configuration of the storage bay cannot be modified without compromising the structural integrity of the aircraft.

Due to the desire to reduce weight and maximize space, the overall size and particularly the length of newer ram air turbines has been reduced.

BRIEF DESCRIPTION OF THE INVENTION

According to one embodiment a ram air turbine (RAT) assembly is disclosed. The assembly includes a turbine having at least one turbine blade that rotates about a turbine driveshaft, a lower gear box coupled to the driveshaft, a generator/pump housing and a strut connected between the lower gear box and the generator/pump housing. The assembly also includes a damping element connected to one of the strut and the lower gear box. The damping element includes an actuator including an extendable member and a mass element connected to the extendable member and that can be moved by the extendable member from a retracted position to an extended position, wherein the mass element is closer to the actuator when in the retracted position than when in the extended position.

In accordance with additional or alternative embodiments, the lower gear box has a housing and the damping element is connected to the housing of the lower gear box.

In accordance with additional or alternative embodiments, the mass element is closer to the housing of the lower gear box when in the retracted position than when in the extended position.

In accordance with additional or alternative embodiments, the damping element is connected to the strut.

In accordance with additional or alternative embodiments, the mass element is closer to the strut when in the retracted position than when in the extended position.

In accordance with additional or alternative embodiments, the assembly further includes: a blade release mechanism and the mass element is caused to be moved from the retracted position to the extended position by the blade release mechanism.

In accordance with additional or alternative embodiments, the mass element is caused to be moved from the retracted position to the extended position due to a solenoid.

In accordance with additional or alternative embodiments, the solenoid is configured to cause the movement after assembly has started to be deployed from a stowed position to a deployed position.

In accordance with additional or alternative embodiments, the mass element is caused to be moved from the retracted position to the extended position due to an electrical signal.

In accordance with additional or alternative embodiments, the electrical signal is provided after assembly has started to be deployed from a stowed position to a deployed position.

Also disclosed is a method of operating an assembly as disclosed above or otherwise herein. The method includes: extending the RAT assembly from a stowed position to a deployed position; and while or after extending the RAT assembly, causing the mass element to move from the retracted position to the extended position.

In accordance with additional or alternative embodiments, in the method the lower gear box has a housing and the damping element is connected to the housing of the lower gear box and wherein the mass element is closer to the housing of the lower gear box when in the retracted position than when in the extended position.

In accordance with additional or alternative embodiments, in the method, the damping element is connected to the strut and wherein the mass element is closer to the strut when in the retracted position than when in the extended position.

In accordance with additional or alternative embodiments, in the method, the assembly further includes a blade release mechanism and wherein the mass element is caused to be moved from the retracted position to the extended position by the blade release mechanism.

In accordance with additional or alternative embodiments, in the method, the mass element is caused to be moved from the retracted position to the extended position due to a solenoid.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As discussed above, most cases, the structural configuration of the storage bay cannot be modified without compromising the structural integrity of the aircraft. Further, Due to the desire to reduce weight and maximize space, the overall size and particularly the length of newer ram air turbines (RATs) has been reduced.

Such systems, however, may experience natural oscillation frequencies when deployed. The frequencies can be based on the rotation of the RAT as well as vibration imparted to the RAT from the aircraft.

One approach is design the RAT system such that its natural frequencies are at least 15% away from the RAT turbine operating frequency/speed. One of the major factors in what the RAT system natural frequencies are, is the aircraft stiffness which historically has been difficult for air framers to predict. As a result of these uncertainties there is a significant amount of uncertainty in what the natural frequencies are on the aircraft until late in the design process when the RAT undergoes a modal survey (ping test) installed on the aircraft.

If there is a natural frequency within 15% or less of the RAT operating frequency, it can lead to many negative consequences which the next slide outlines.

The dependency on aircraft stiffness for the RAT system stiffness limits the reuse of the RAT on other programs.

Further, there are currently a limited amount of changes to the design that can be made to modify the natural frequencies. Such changes could include adding material to the RAT or the airframe to damp the system but that can increase size/weight and stress the airframe.

Figure 1:
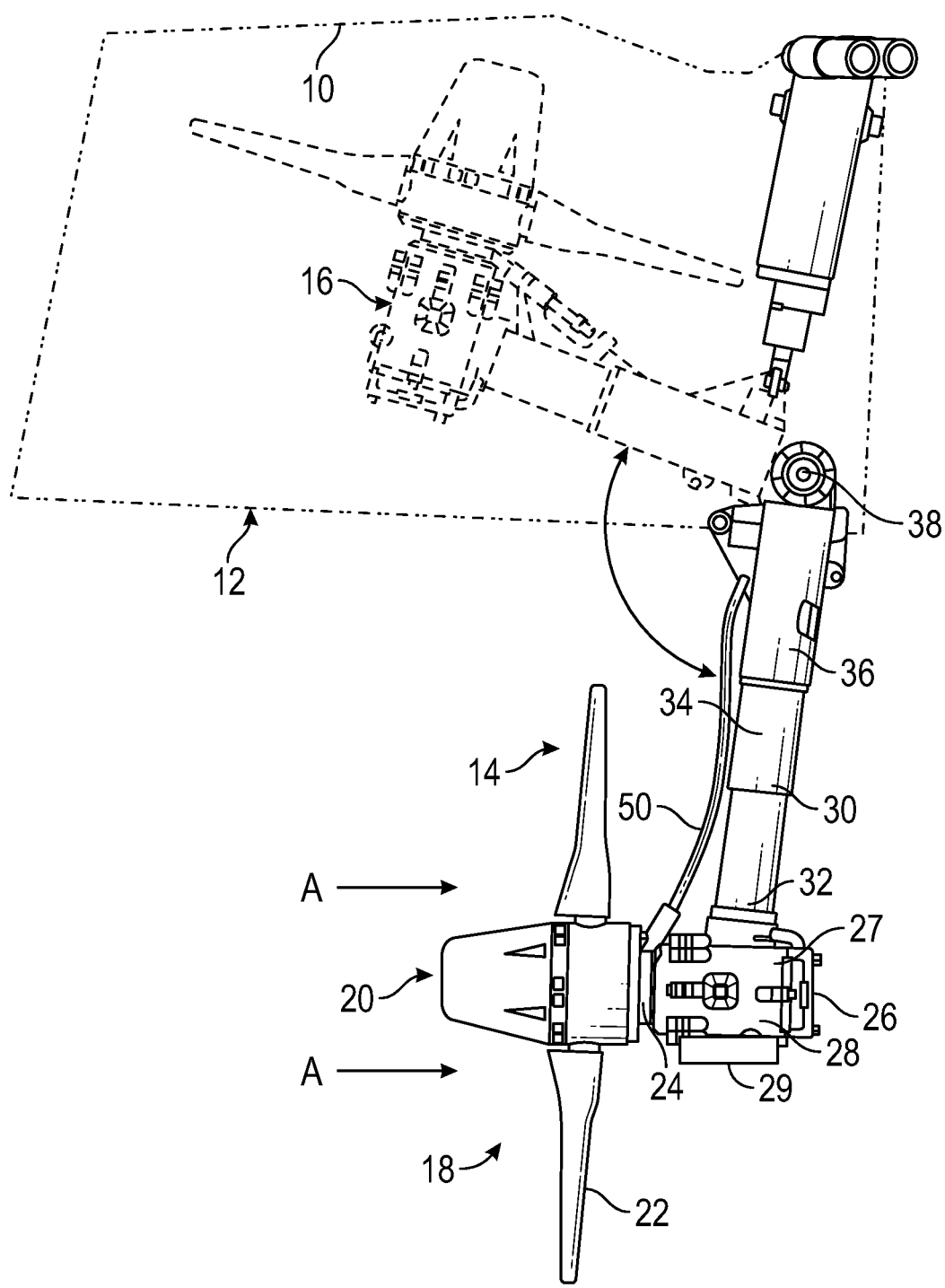
FIG. 1 is a side view of an exemplary ram air turbine assembly.

Referring now to FIG. 1 an exemplary ram air turbine (RAT) assembly 14 is illustrated. The assembly 14 is included in aircraft 10 in use, however, embodiments herein can be directed to just the assembly before it is installed in the aircraft 10. The aircraft 10 schematically shown in FIG. 1 includes an opening or a hatch 12 through which the RAT assembly 14 moves from a stowed position 16 to a deployed position 18.

The RAT assembly 14 includes a turbine 20 having at least one turbine blade 22 that rotates about a turbine driveshaft 24. The turbine driveshaft 24 is coupled to a lower gear box 28 adjacent a first end 26. In the stowed position, illustrated using phantom lines, the RAT assembly 14 is disposed within the aircraft structure 10 and the turbine blades 22 are fixed in a desired orientation to prevent contact with the surrounding structure. The desired orientation of the turbine blades 22 provides for movement of the RAT assembly 14 through the opening of the aircraft structure 10.

The RAT assembly 14 also includes a strut 30 connected at a first end 32 to the turbine 20 adjacent the lower gear box 28, and coupled at a second, opposite end 34 to a generator/pump housing 36. The housing 36, and therefore the strut 30 and turbine 20, is supported on the aircraft structure and is configured to rotate about a pivot 38 to provide for movement of the RAT assembly 14 between the stowed position 16 and the deployed position 18. The housing 36 supports a mechanical device. In one embodiment the device is a generator (not shown) that is driven by the plurality of turbine blades 22. The example generator is disposed within the housing 36. The turbine blades 22 rotate in response to the airstream A along the outside of the aircraft structure 10 to drive the generator. As appreciated, although the example RAT assembly 14 is disclosed with a generator, the ram air turbine 20 could also drive any other device, such as a hydraulic pump for example.

Figure 2:
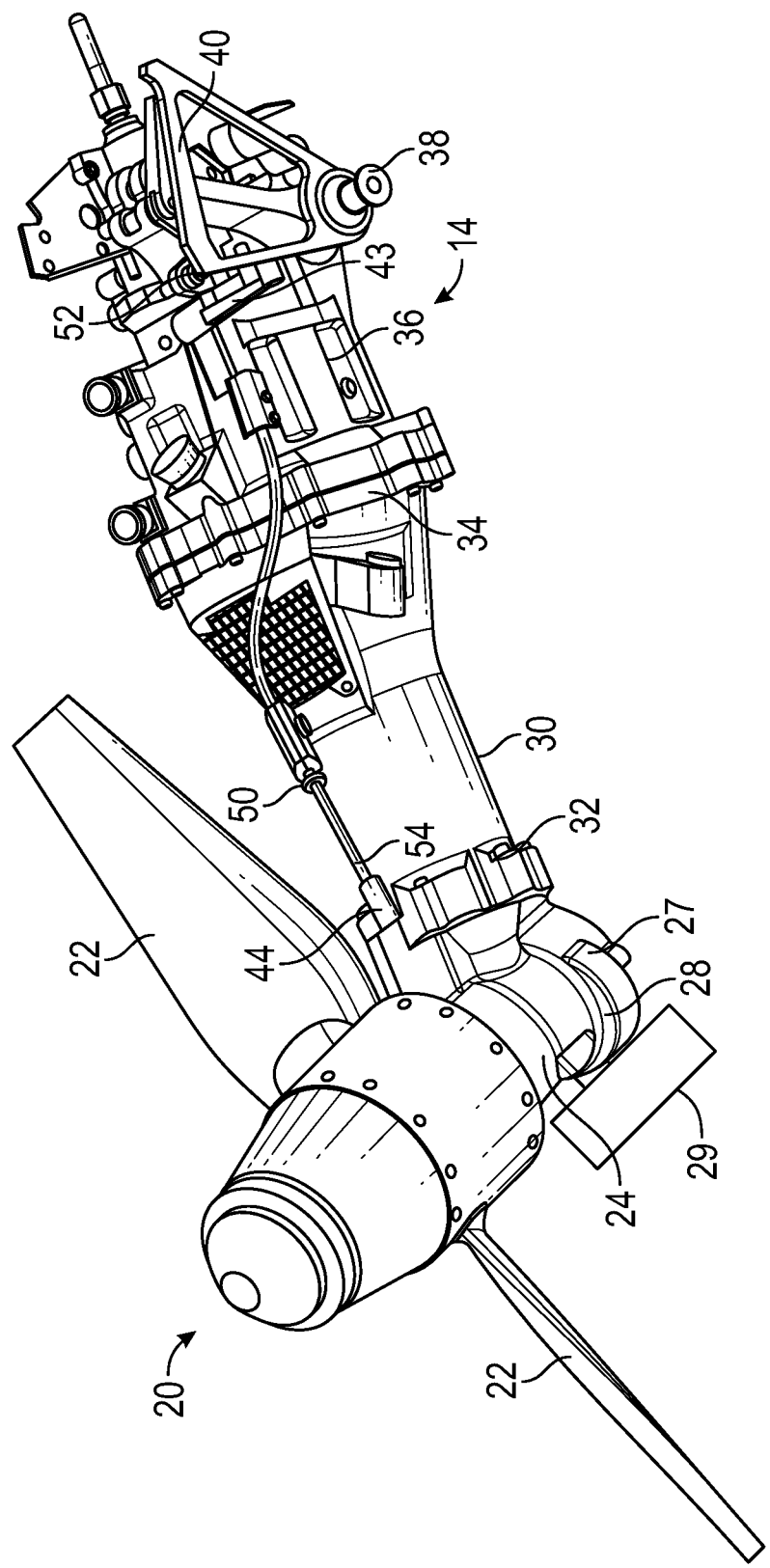
FIG. 2 is a perspective view of an exemplary ram air turbine.

As shown in FIG. 2, The RAT assembly 14 includes a release lever 40 configured to rotate about a pivot 38 attached to the housing 36. The RAT assembly 14 also includes a turbine release pin 44 that engages the turbine driveshaft 24 by way of a driveshaft aperture (not shown), such as a hole, indentation, or slot for example. A release cable 50 extends from the release lever 40 to the turbine release pin 44 such that a first end 52 of the release cable 50 is fastened to the release lever 40 and a second, opposite end 54 of the release cable 50 is coupled to the turbine release pin 44. The release lever 40 rotates about pivot 38 until engaging a stop 43 during deployment of the RAT assembly 14.

Movement of the RAT assembly 14 to a deployed position includes movement of the housing 36 about the pivot 38. The movement of the housing 36 about pivot 38 causes a corresponding movement of the release lever 40. During deployment of the RAT assembly 14, the release lever 40 will rotate about pivot 38 until it contacts the stop. Further rotation of RAT assembly 14 once the release lever 40 engages the stop will cause the release cable 50 to apply a force to the turbine release pin 44. The release cable 50 has such a length that it will pull the turbine release pin 44 from the driveshaft aperture once the housing 36 has moved past a partially deployed position, thereby unlocking the turbine driveshaft 24. Removal of the turbine release pin 44 allows the turbine driveshaft 24 to rotate freely, and the turbine 20 to operate as intended to generate power.

As shown in both FIGS. 1 and 2, the RAT assembly 14 can also include a damping element 29. This damping element 29 can be provided, as more fully described below, to change the modal frequencies of the RAT assembly 14. The damping element 29 can be positioned on the lower gear box 28 and, in particular, on a housing 27 of the lower gear box 28. The damping element 29 could be place on other locations, however.

Figure 5:
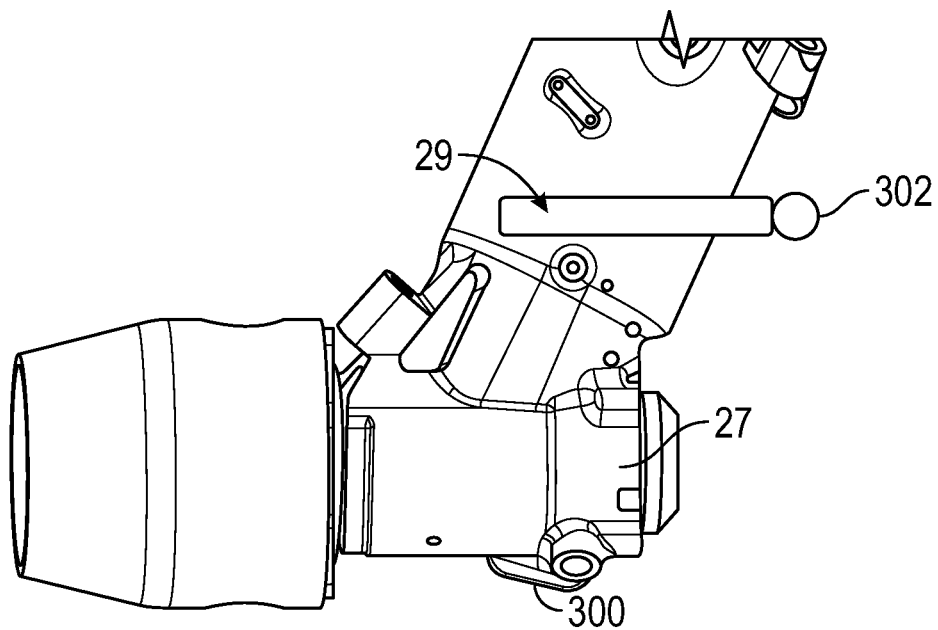
FIG. 5 is a side a portion of a ram air turbine assembly according to an embodiment of the invention where the damping element is in a retracted position and connected to the strut.
Figure 6:
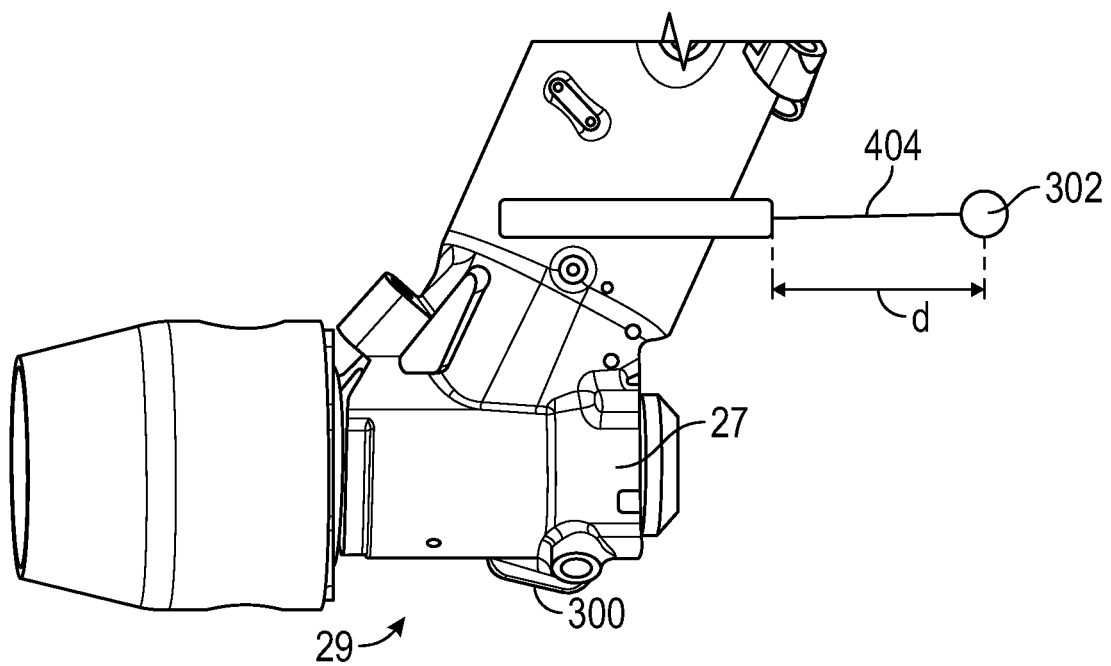
FIG. 6 is a side a portion of a ram air turbine assembly according to an embodiment of the invention where the damping element is in a extended position and connected to the strut.

Alternatively, and as shown in FIGS. 5 and 6, the damping element 29 can be connected to the strut.

Figure 3:
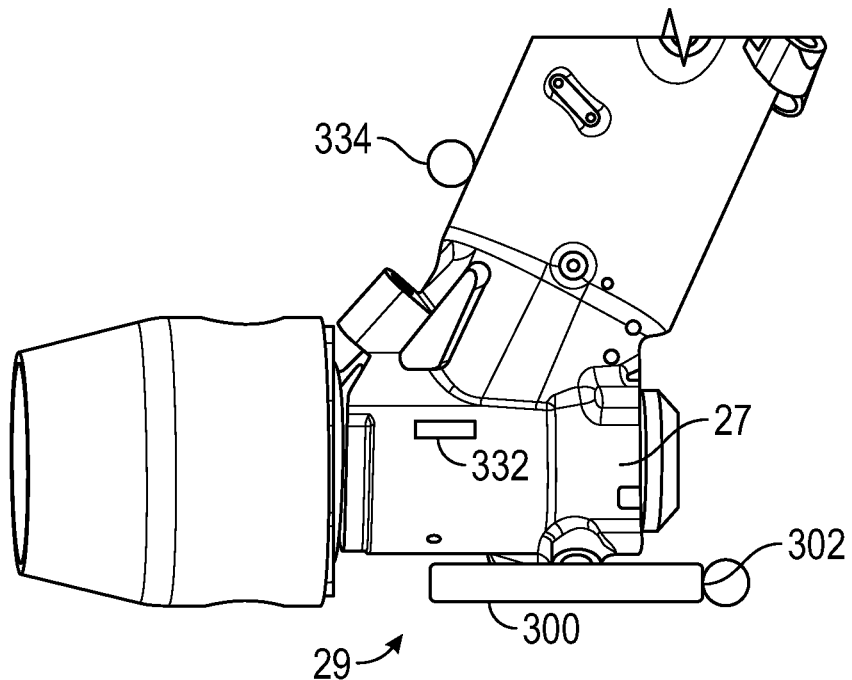
FIG. 3 is a side a portion of a ram air turbine assembly according to an embodiment of the invention where the damping element is in a retracted position and connected to the gear box housing.
Figure 4:
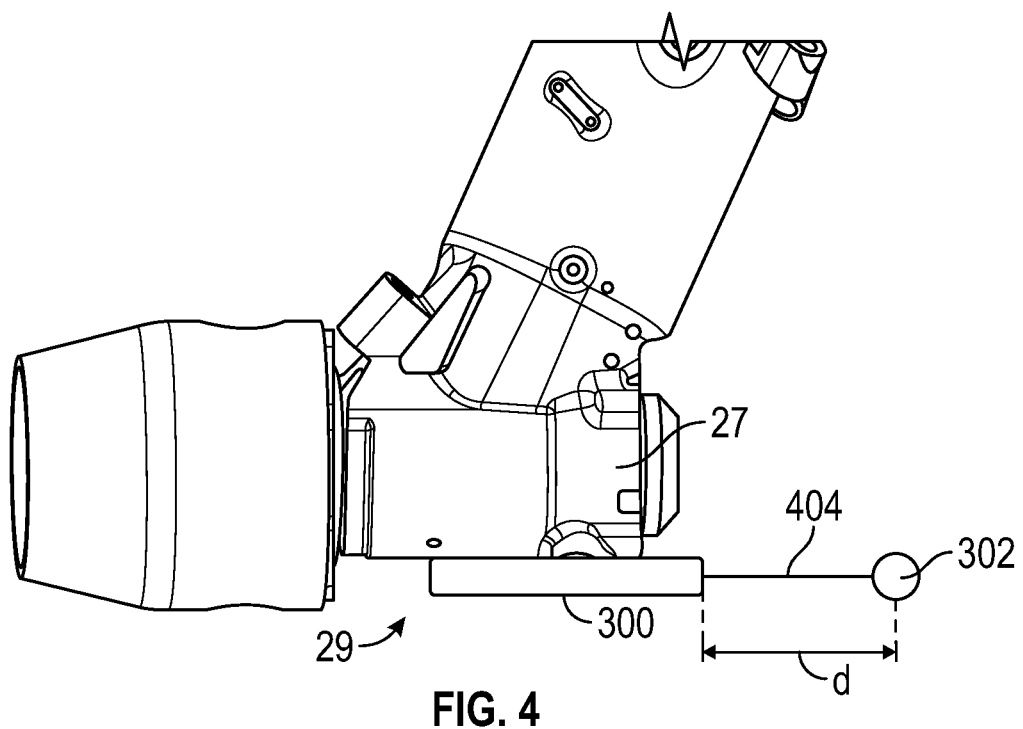
FIG. 4 is a side a portion of a ram air turbine assembly according to an embodiment of the invention where the damping element is in a extended position and connected to the gear box housing.

With additional reference now to FIGS. 3 and 4, the damping element 29 can include an actuator 300 that can be used to move a mass element 302 from a retracted position (FIG. 3) to an extended position (FIG. 4). In one embodiment, the actuator 300 includes an extendable member 404.

The extendable member 404 can a shaft in one embodiment. In particular, the extendable member 404 can be either a rigid or telescoping shaft.

The actuator 300 can be any type of actuator. In one embodiment the actuator 300 can be a spring-loaded actuator.

Activation of the actuator 300 is discussed further below. It has been discovered by the inventors herein that placing a mass (e.g., mass element 302) aft of the gearbox can cause the RAT natural frequencies drastically change. That is, when the extendable member 404/mass element 302 are in the extended position extended, the RAT natural frequencies are different than when in the retracted position. The amount of change in RAT natural frequencies can be adjusted by the weight of the movable element 302 being extended away from the gear box 28/housing 27. Further, the distance (d) (see FIG. 4) the mass element 302 is extended by the movable element 404 can also adjust the natural frequencies.

Based on the disclosure herein it shall be understood, therefore, that the mass of the mass element 302 and distance (d) the mass element 302 is away from the gearbox 27 can be easily adjusted after the aircraft ping test is performed with limited cost to the development of the RAT assembly 14. Note, even if the RAT assembly 14 is changed this should not require returning to the high-speed wind tunnel because the purpose of the high-speed wind tunnel is not to validate the RAT structure due to loads experienced on the aircraft. Further, by employing the disclosed damping element 29, a single RAT assembly design can be used on different aircraft without having to redesign the assembly 14; the changes could be limited to variation in the mass of the mass element 302 and distance (d) to achieve the desired minimum 15% difference between the RAT operating frequency and the natural frequency of the RAT assembly 14 when on an aircraft.

Further, in one embodiment, the actuator 300 can be either automatically or manually retractable so that the size of the damping element 29 can be minimize so as not to exceed the required envelope of the RAT assembly 14 when in the stowed position.

The damping element 29 can be causes to extend from the retracted position to the extended position after movement of the RAT assembly 14 from a stowed to a deployed position has begun. Examples include having the extension begin after the housing 36 of RAT assembly 14 beings move about the pivot 38 or after it has cleared the doors 12. In one embodiment, the damping element 19 is signaled to activate and deploy/extend the mass element 302 when the RAT has been fully deployed.

In one or more embodiments, activation of the actuator mass can be, and by way of example only, via solenoid 330, or an electrical signal due to information from a sensor 334 or via the blade release mechanism 50 or a combination thereon.

As shown in FIGS. 5 and 6, the damping element 29 can alternatively be located on the strut 34 and operates in the same or similar as described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A ram air turbine (RAT) assembly, comprising:
   a turbine having at least one turbine blade that rotates about a turbine driveshaft;
   a lower gear box coupled to the driveshaft;
   a generator/pump housing;
   a strut connected between the lower gear box and the generator/pump housing; and
   a damping element connected to one of the strut and the lower gear box, the damping element including:
   an actuator including an extendable member; and
   a mass element connected to the extendable member and that can be moved by linear extension by a distance d of the extendable member from a retracted position to an extended position, wherein the mass element is closer to the actuator when in the retracted position than when in the extended position.

2. The assembly of claim 1, wherein the lower gear box has a housing and the damping element is connected to the housing of the lower gear box.

3. The assembly of claim 2, wherein the mass element is closer to the housing of the lower gear box when in the retracted position than when in the extended position.

4. The assembly of claim 1, wherein the damping element is connected to the strut.

5. The assembly of claim 4, wherein the mass element is closer to the strut when in the retracted position than when in the extended position.

6. The assembly of claim 1, wherein the assembly further includes:
   a blade release mechanism; and
   wherein the mass element is caused to be moved from the retracted position to the extended position by the blade release mechanism.

7. The assembly of claim 1, wherein the mass element is caused to be moved from the retracted position to the extended position due to a solenoid.

8. The assembly of claim 7, wherein the solenoid is configured to cause the movement after the assembly has started to be deployed from a stowed position to a deployed position.

9. The assembly of claim 1, wherein the mass element is caused to be moved from the retracted position to the extended position due to an electrical signal.

10. The assembly of claim 9, wherein the electrical signal is provided after the assembly has started to be deployed from a stowed position to a deployed position.

11. A method of operating a ram air turbine (RAT) assembly according to claim 1, the method comprising:
    extending the RAT assembly from a stowed position to a deployed position; and
    while or after extending the RAT assembly, causing the mass element to move from the retracted position to the extended position.

12. The method of claim 11, wherein the lower gear box has a housing and the damping element is connected to the housing of the lower gear box and wherein the mass element is closer to the housing of the lower gear box when in the retracted position than when in the extended position.

13. The method of claim 11, wherein the damping element is connected to the strut and wherein the mass element is closer to the strut when in the retracted position than when in the extended position.

14. The method of claim 11, wherein the assembly further includes a blade release mechanism and wherein the mass element is caused to be moved from the retracted position to the extended position by the blade release mechanism.

15. The method of claim 11, wherein the mass element is caused to be moved from the retracted position to the extended position due to a solenoid.

* * * * *